United States Patent [19]

Ochi

[11] Patent Number: 4,580,782
[45] Date of Patent: Apr. 8, 1986

[54] MEMORY MAPPING SCHEME FOR ONE-DIMENSIONAL MEMORY STORAGE SYSTEM

[75] Inventor: Shikanosuke Ochi, Tokyo, Japan

[73] Assignee: Sega Enterprises, Ltd., Tokyo, Japan

[21] Appl. No.: 511,594

[22] Filed: Jul. 7, 1983

[30] Foreign Application Priority Data

Oct. 29, 1982 [JP] Japan .................. 57-190481

[51] Int. Cl.⁴ .................. H04N 5/76; A63F 9/22
[52] U.S. Cl. .................. 273/86 R; 273/1 E; 273/88; 273/85 G; 273/DIG. 28; 434/43; 434/307; 340/725; 358/342; 364/521
[58] Field of Search .......... 273/1 E, 85 G, DIG. 28, 273/86 R, 86 B, 25; 434/42, 43, 307, 323; 340/723–725

[56] References Cited

U.S. PATENT DOCUMENTS

| | | | |
|---|---|---|---|
| 4,127,849 | 11/1978 | Okor | 273/DIG. 28 |
| 4,199,036 | 4/1980 | Wereb | 180/907 |
| 4,207,959 | 6/1980 | Youdin et al. | 46/256 |
| 4,333,152 | 6/1982 | Best | 273/DIG. 28 |
| 4,368,517 | 1/1983 | Lovering | 434/42 |
| 4,414,584 | 11/1983 | Kurata | 358/342 |
| 4,475,132 | 10/1984 | Rodesch | 434/43 |

Primary Examiner—Richard C. Pinkham
Assistant Examiner—MaryAnn Stoll Lastova
Attorney, Agent, or Firm—Price, Gess & Ubell

[57] ABSTRACT

A one-dimensional memory storage device, such as a video disc, is utilized to store graphic image symbols for video game displays. The storage device is organized so that the graphic symbols may be retrieved rapidly enough to give the visual impression that the entire display, including background or scene depiction, is changing in response to the player-manipulated controls. The memory organization scheme utilized establishes a plurality of jump sequences. The particular sequence being utilized to withdraw graphic symbol information from memory is determined by the physical movement of a player-operated control device, i.e., a joystick. Certain frequently used scenes, such as explosions, or bullet or rocket trajectories, for example, are generated separately by a fixed image producer. The graphic image symbols that reproduce such a scene on the CRT screen are stored in a memory in the fixed image producer which is triggered by the information contained on the video disc or by a player-manipulated control device, such as a pushbutton, for example.

9 Claims, 18 Drawing Figures

| | | | | | | | #0 |
|---|---|---|---|---|---|---|---|
| #45K | #42K | #39K | #15K | #12K | #9K | #6K | #3K |
| No. 15 PITCH | No. 14 PITCH | | No. 5 PITCH | No. 4 PITCH | No. 3 PITCH | No. 2 PITCH | No. 1 PITCH |

100

MEMORY MAPPING SCHEME FOR ONE-DIMENSIONAL MEMORY STORAGE SYSTEM

BACKGROUND OF THE INVENTION

1. Field of the Invention

The present invention relates generally to improvements in graphic image symbol storage systems, and more particularly pertains to new and improved memory mapping schemes for one-dimensional memory storage systems and a storage organization wherein one-dimensional storage systems are utilized in conjunction with other memory means to generate a graphic image or images to be displayed on a CRT screen.

2. Description of the Prior Art

Many different types of graphic memory storage systems including one-dimensional memory storage systems such as video disc, magnetic floppy disc and optical disc systems are used as storage for video game displays. The graphic image stored on a normal video disc memory system is stored and retrieved sequentially. In other words, the symbol for each graphic frame which contains all the data for a complete image to be displayed on a CRT for a fraction of a second are normally scanned for display on a CRT, one by one, at an approximate speed of 30 frames per second starting from the first frame to the 54,000th frame. It takes thirty minutes to run through all the frames for normal video disc models. The usual organization of the frames which determines the time flow of the story line of the display is that the frames of the lower numbers appear first. If frame jumps occur, in other words, there is a gap between sequential frames being displayed, there is a discontinuity in the story line.

Many video disc players have various jump sequence systems available besides a halt condition which gives access and displays a certain frame repeatedly. For convenience, we will call this halt condition the N:0 mode. For normal display, the frames are accessed one by one in sequential order. For convenience we will call this the N:1 mode. When the frames are being displayed sequentially in reverse order at normal speed we will call the N:−1 mode. The video disc players that have a fast scan mode generally operate by providing access to every fifth frame sequentially. For fast scan in the forward direction, we will call this mode the N:5 mode.

Considering the performance parameters of a typical video disc player, access to a particular frame can be accomplished without a delay becoming apparent to the viewer within a range of ±15 frames. In other words, the player can move approximately 15 frames in either direction within the blanking time. If access beyond 15 frames is required, a frame display time must be utilized. For example, if a jump sequence of the N:100 or N:−100 mode is used, the frame memory is accessable every other frame time because a frame and a blanking time is needed to move over the range of 100 frames. In this case, only 15 frames per second are displayed. Display quality is decreased due to flickering. This flickering, however, is tolerable and over a period of time becomes unnoticeable. The quality of the display can be improved somewhat by repeating display of the same frame twice during the time required for the jump. Whether this is done or not amounts to a tradeoff between quality and cost in a game environment.

Jump sequences are employed for special purposes such as fast scanning of the frames in memory, repeating the scene or backing up the time flow. These cases are not the normal game display procedure and viewers notice that the game play is abnormal any time display varies from the N:1 mode.

In a video game system, the hardware utilized includes control switches and/or levers for the players to operate. These control devices are used to change the relative dimensional relation between the player's symbol (such as his ship, man, etc.) and the surrounding symbols (such as enemies, roads, etc.). The switches and/or the levers manipulated by the player must provide an immediate response on the CRT. For instance, while driving a car on a road, if the player steers the control lever or steering wheel to the right, the player's car must go to the right of the road, while the road scene must move to the left, keeping his car steady on the CRT. In a shooting game, a bullet must be ejected from the gun immediately after the player actuates the firing button.

Conventional video games produce these effects by utilizing simple computer graphics of the symbol patterns on the CRT that are being changed in response to the manipulation of the controls. These are generated by the use of microprocessors and array memories. These computer graphics, however, are all cartoon style and far from the realistic appearance produced by movies or regular broadcast TV.

There have been video game systems on the market that employed both a computer graphics system and a video disc for the purpose of presenting a video game with a realistic background scene. In these hybrid systems a player's symbol was produced by the computer graphics hardware, while the rest of the scene, including objective patterns, were produced by the video disc system. The two images were simply displayed by superimposing one on the other. The varying locations of the objective patterns (such as enemies, road curves, etc.) in each frame were all memorized in the computer memory rather than in the video disc system, as was the position of the player's symbol. When a player's symbol and the moving objective patterns met on the screen, the disc frame was caused to jump to a separate series of frames to show an explosion or similar scene.

Since the video disc images and the images retrieved from computer memory were superimposed, the composite scene was not natural in many respects, such as shadows, relative sizes, reflection of light, color hues, brightness, color tone, etc. It was not natural also because the background scene changed constantly to a great extent, while the player's symbol remained fairly stationary. This type of hybrid system is also very expensive because it requires that the location of all the objective patterns in all the frames must be memorized by a computer memory rather than by the video disc memory. This greatly increases the cost of labor and hardware.

From the standpoint of the viewer or player, however, the defect of this system is that only a small part of the images being displayed is controllable by the manual controls operated by him. From the standpoint of appeal to a viewer/player it is more desirable that his control devices cause direct realistic changes on the screen. For example, if a whole playfield scene is controllable by a player as he actually views it from his ship, it is more attractive than if only the player's ship is controllable, while the rest of the scene simply moves along at its own pace, untouchable by the player.

The present invention solves the above-mentioned defects of a hybrid-type system and presents a video game display system at reasonable cost with realistic scenes from moves which utilize the full screen with wide and continuous variations according to the player's control at any given moment.

SUMMARY OF THE INVENTION

A linear memory used to store graphic image symbols is mapped by use of jump sequences to simulate dimensional storage. Each unique jump sequence corresponds to a specific physical movement of the player-manipulated controller, or is dictated by the game program. The graphic image symbols for frequently used scenes or images are stored in another memory device and are retrieved as required upon prompting from the player-manipulated controller or by the information contained in the linar memory device.

BRIEF DESCRIPTION OF THE DRAWINGS

The objects and many of the attendant advantages of this invention will be readily appreciated as the same becomes understood by reference to the following detailed description when considered in conjunction with the accompanying drawings in which like reference numerals designate like parts throughout the figures thereof, and wherein.

DESCRIPTION OF THE PREFERRED EMBODIMENTS

This invention utilizes a video disc player which incorporates the feature of a frame jump system with a fairy large range such as from $N: \pm 50$ to $N: \pm 300$. The jump range has no specific significance to the present invention. It is simply a matter of compromise between software and hardware considerations with respect to cost. A jump range of $N: \pm 100$ has been found to be the most economical and suitable range. Accordingly, all game examples explained hereinafter are based on a jump range of about $N: \pm 100$. In the $N: \pm 100$ mode, if frame scanning is started from the 0 frame, the CRT will display the frames in linear memory in the following order. At every 1/30 of a second:

No. 0, No. 0, No. 100, No. 100, No. 200, No. 200, No. 400, No. 400, . . . or,

No. 0, (blank), No. 100, (blank), No. 200, (blank), No. 400, (blank) . . . . In this jump mode it will take about 36 seconds to scan the frames from 0 to 54,000, which is the normal volume of frames on a video disc.

Figure 1:
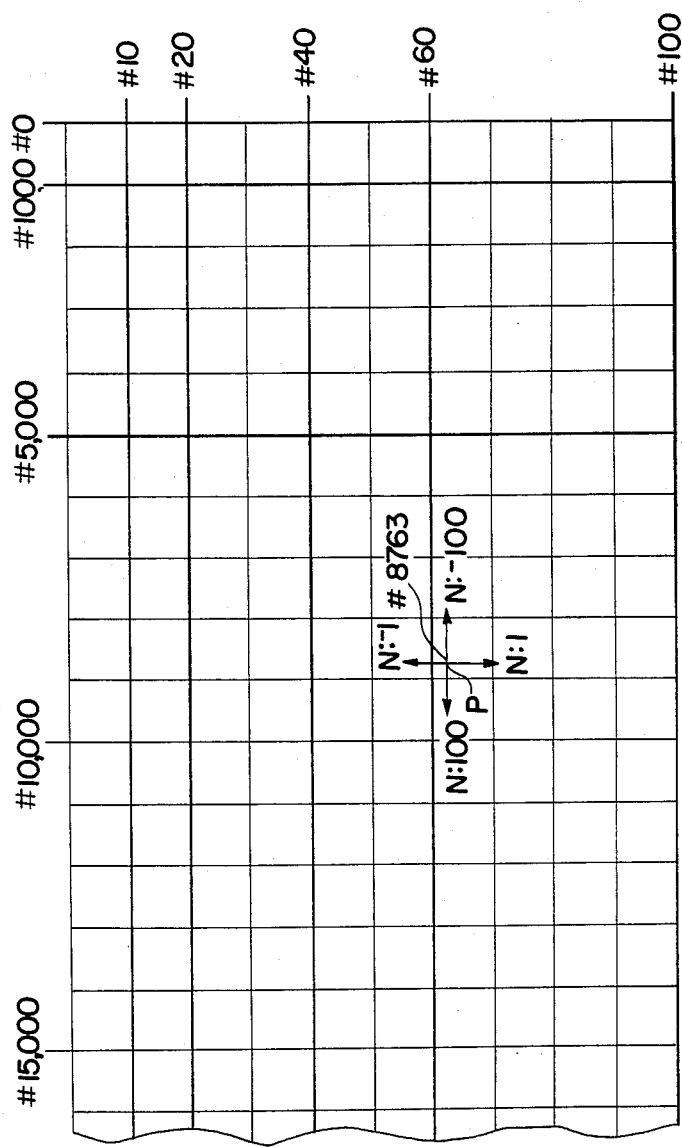
FIG. 1 is a graphic illustration of a jump sequence mapping scheme for a linear memory according to the present invention.

Referring now to FIG. 1, an example of a coordinate map which includes the $N: \pm 100$ mode is illustrated. The map locates the serial frame numbers on the horizontal from 0 to No. 15,000, for example, starting from the right top at 0 and extending to the left to 15,000. The horizontal axis illustrates the $N: \pm 100$ mode. In this manner, all frame numbers are equivalent to its coordinate point, for example, arbitrary point P is equivalent to frame No. 8763. The adjoining point to its left according to the jump sequence is 8863 (N:100). The adjoining point to its right is 8663 (N:−100). In other words, the N:100 mode scans frames to the left, while the N:−100 mode scans frames to the right.

In the same manner, the scanning of frames in a $N: \pm 1$ mode is illustrated on the vertical axis starting at the upper right-hand corner from frame 0 and going down to frame 100. Referring again to a reference point P, scanning in the N−1 mode would be upwards from this point, and scanning in the N:1 mode would be downwards from this point. For the example shown, point P would be frame 63. The adjacent point next to it in the N:−1 mode would be 62. The adjacent point next to it in the N:1 mode would be 64. In this manner, if the series of the scanned frames which contain the graphic information are systematically arranged so that they look natural and in a normal order of time flow, the viewer is able to select any one of four modes at any time by operating the manually-manipulatable mode switches.

The ability to select four different modes according to the invention allows two different relative relations to be controlled by the vertical scan ($N: \pm 1$) and two more different relative relations to be controlled by the horizontal scan ($N: \pm 100$). For example, for horizontal scan, the distance between a viewer and an object in front of the viewer can be controlled. For vertical scan, left and right relation of the viewer and the object can be controlled.

The horizontal and vertical relations can be exchanged if frame volume of the gradual changes of both scenes is within 100 frames. Other instances of combinations that can be controlled are:

(1) Up and down relation of viewer and objects/distances between the two;
(2) Rotational angle of an object/dimensions of the object;

(3) Color hue graduation of objects/brightness of it; and (4) Fade-in and out of an object/dolly in and out of the object.

Figure 2:
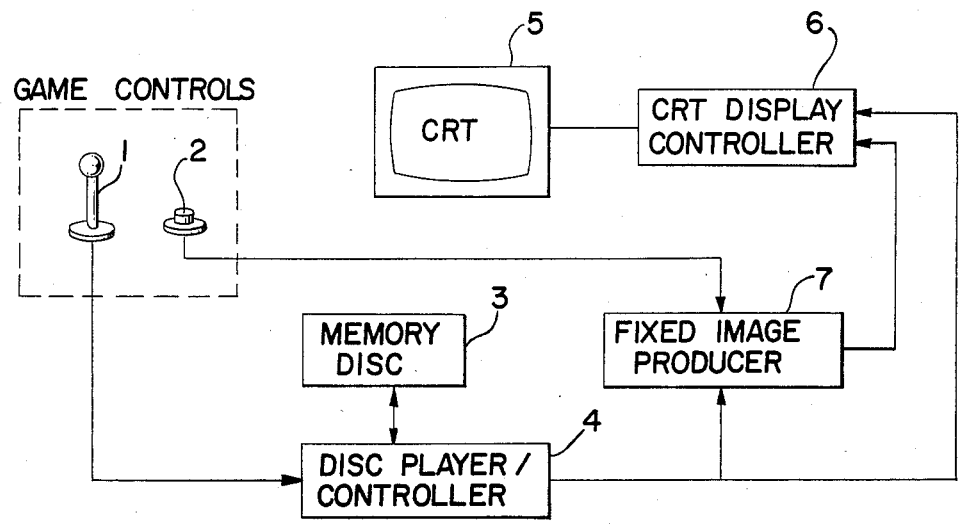
FIG. 2 is a block diagram of a video image display system according to the present invention.

Referring now to FIG. 2, a block diagram of a system for video game display which employs the invention is illustrated. The game controls are illustrated as being a joystick 1 which has four switches (not shown) and a pushbutton switch 2 which may be used as a firing button. The four switches of joystick 1 may correspond to the four scanning modes N:1, N: 1, N:100 and N:−100. The pushbutton 2 may be utilized to produce firing trajectories such as AH and BH shown in FIG. 6 and FIG. 9, for example. Such trajectories of bullets or missiles are ejected from a gun or missile launcher, A and B shown (FIG. 6, FIG. 9) of the player's ship.

The memory disc storage device 3 is activated by the disc player/controller 4. The frames retrieved from the memory disc are displayed on CRT 5 through the action of the interface control circuitry of CRT display controller 6. The memory disc and disc player/controller circuitry are devices of the type manufactured by Pioneer Electronics Company. The CRT display controller 6 is a microprocessor-based device that provides timing and interface control between the CRT circuitry and the disc player/controller 4 and the fixed image producer 7.

Figure 9:
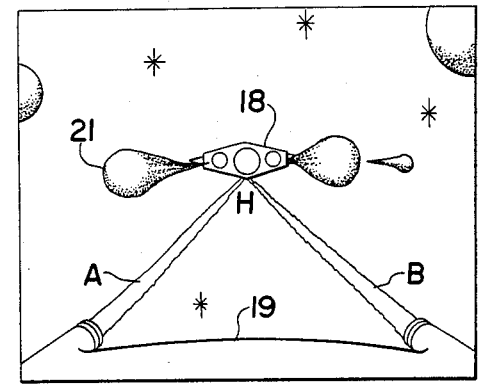
FIG. 9 is a pictorial illustration of a video display according to the frame organization of FIG. 7.
Figure 6:
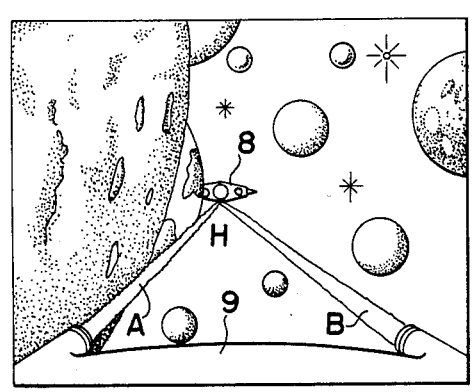
FIG. 6 is a pictorial illustration of a video display according to the frame organization of FIG. 3.

The fixed image producer 7 generates images that are frequently and intermittently used in the viewing sequence, such as bullet trajectories or scenes of an explosion, for example. The circuitry for the fixed image producer provides for the storage of such frames and movement of the stored frames pursuant to game control. The fixed image producer is activated either by a control device such as pushbutton 2 or a signal from the disc player/controller 4. The trajectories AH and BH shown in FIG. 6 and FIG. 9 are examples of images which are produced at a fixed position on the CRT by the fixed image producer 7.

Figure 3:
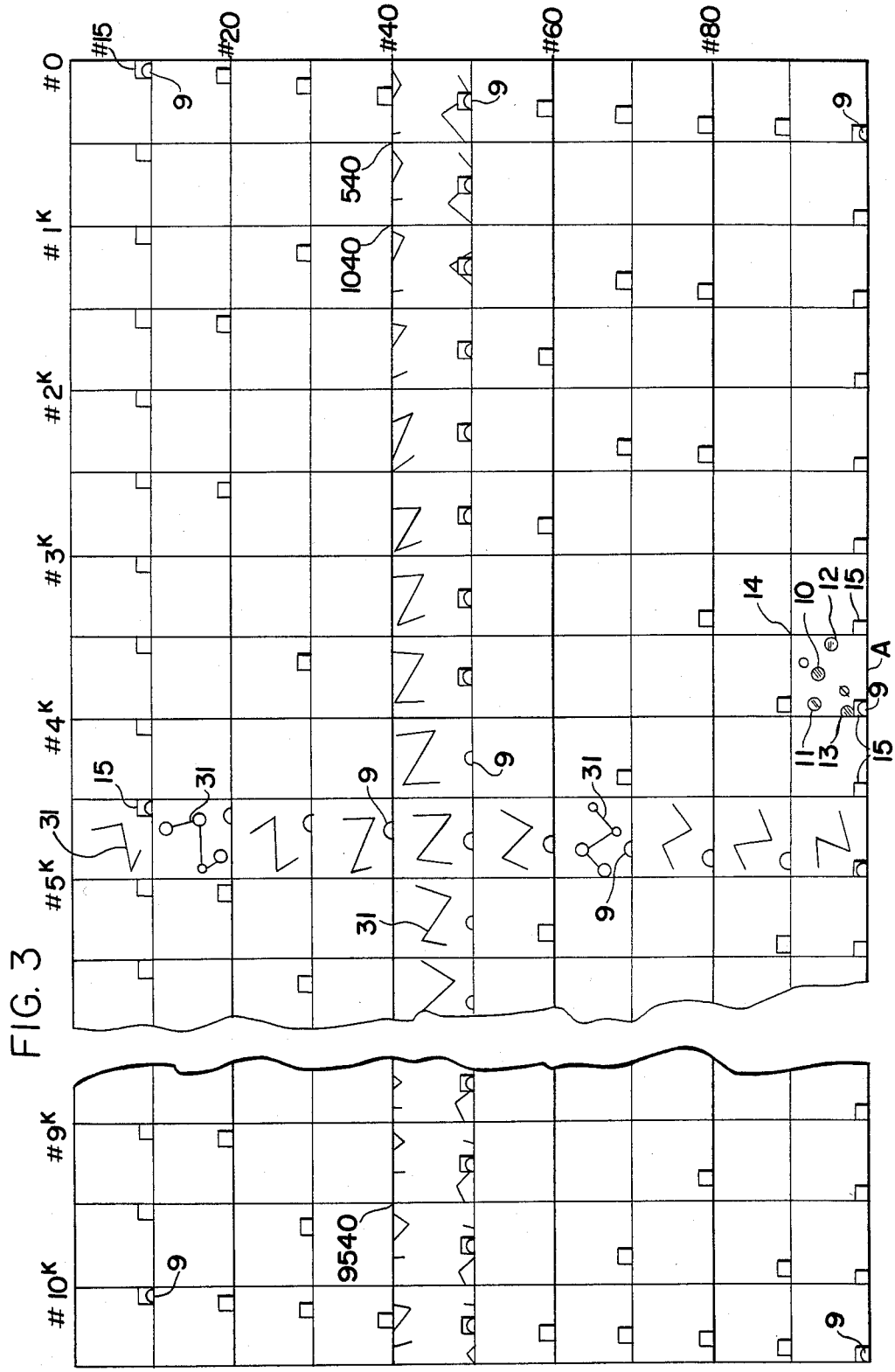
FIG. 3 is a schematic illustration of the frame organization on a linear memory system following a mapping scheme according to the present invention.

The organization of the frame sequence stored on the memory disc 3 is systematic, and according to this invention, in a manner that permits them to be accessed in one of four modes at any time, complying to the operation of the joystick 1. FIG. 3 is an example of a coordinate map of the frames stored on the video disc of FIG. 2 for a space war game having scenes of the type shown in FIGS. 4 through 6.

The object of the game is to have a player in a space vehicle 9 voyage through space where many planets 10, 11, 12 and 13, for example, are floating or moving slowly. In addition, the player is looking for an enemy ship 8 hiding behind one of the planets for the purpose of shooting it and destroying it. The player can pilot his ship 9 to move left, right, backward and forward by operating the joystick 1 which has four switch positions.

In this particular game, the vertical scan (N:±1) on the map of FIG. 3 is illustrated by the vertical axis which is labeled No. 0 through No. 80. The vertical scan produces the left and right movement of the player's ship. The horizontal scan (N:±100) is illustrated by the horizontal axis on FIG. 3. This is labeled No. 0 through No. 10K. The horizontal scan provides for the back and forth movement of the ship. Thus, when the joystick 1 is pushed forward, the planets 10, 11, 12 and 13, for example, making up the front scene come closer to the player as if the player's ship 9 is advancing forward. When the joystick is pulled backward, the front scene backs up as if the player's ship 9 is backing up. When the joystick is pushed to the left, the whole front scene moves to the right as if the ship 9 is moving to the left. When the joystick is pushed to the right the whole front scene made up of the planets 10, 11, 12 and 13 moves to the left as if the ship 9 is moving to the right.

If a player keeps pushing the joystick forward in spite of the closing in of a planet in front of the ship, the result will be scenes of collision and the consequent explosion. If a player finds an enemy ship 8 (FIG. 6) behind a planet he will want to bring its figure to the center H of the CRT screen by piloting his ship left or right. When the trajectories of the firing beams cross at the enemy ship 8 location there will be an explosion of the enemy ship 8 when the firing button 2 is pushed. These trajectories cross only at the center H of the CRT screen.

A total of 10,000 frames of game scenes are utilized and arranged as shown in the coordinate map of FIG. 3. Each block in FIG. 3 represents a relative position between the player's ship 9 and the planets 10, 11, 12 and 13 of the frame number coincident with the upper right-hand corner of the block. For instance, block A of FIG. 3 shows relative position between the player's ship 9 and the various planets 10, 11, 12 and 13 of frame No. 3590. That is the frame number at point 14.

Figure 4:
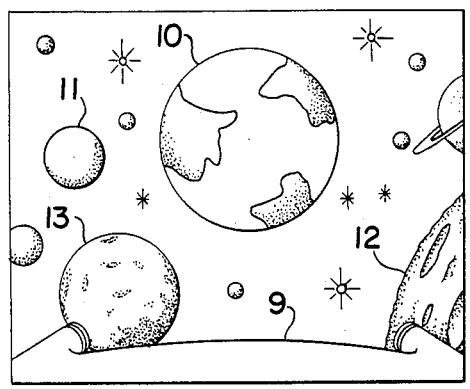
FIG. 4 is a pictorial illustration of a video display according to the frame organization shown in FIG. 3.
Figure 5:
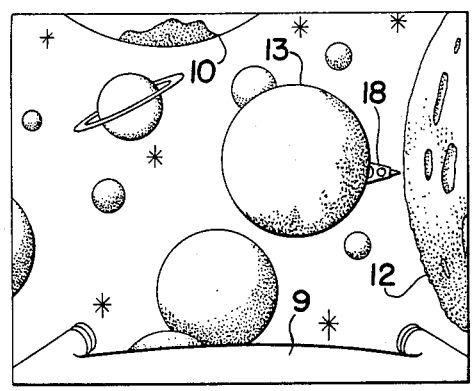
FIG. 5 is a pictorial illustration of a video display according to the frame organization of FIG. 3.

On the column of frame 4500 (two columns to the left of the 3590) ten frames are shown vertically. These frames indicate the gradual changes of the relative positions between the player's ship 9 and the four main planets 10, 11, 12 and 13. These four planets happen to be the largest planets in the scene. The N-shaped link 31 represents the relative position between these four main planets which are shown in block A of FIG. 3, and in addition are shown in FIGS. 4, 5 and 6 in pictorial form.

Looking at the ten representative frames in frame column 4500, the relative position of the player's ship 9 with respect to the group of planets changes gradually from right to left during the display of 100 frames from frame 4500 at the top of the column to frame 4599 at the bottom of the column. In other words, on the CRT screen the center position of the four planets 10, 11, 12 and 13 moves 1% per frame from the farthest left to the farthest right. Meanwhile, in the group the four planets 10, 11, 12 and 13 also change mutual positions gradually.

On the row of frame Nos. 40, 540, 1040 . . .), 9540 and so on, the player's ship 9 is always almost on the center line of the group of the four planets 10, 11, 12 and 13. However, the distance between the two gradually changes, starting from the middle of one group, frame 40, to where it almost passes over the next advancing group, frame 9540.

In this kind of layout of frame scenes, the scenes or frames with the last two numbers 99 and the following 00 do not continue because in all frames at the top of the map the player's ship 9 is at the farthest right, and in all frames at the bottom of the map the player's ship 9 is at the farthest left with respect to the group of planets 10, 11, 12 and 13. The top and bottom of the frame map must be fenced in to stop overscan. Also, both sides of the map must be fenced in to limit the memory of the game. For these reasons, all the frames bordering on all four sides have a collision scene to stop the scan at these frames. When the frame of the collison scene is accessed and displayed, a half collision scene is produced by the fixed image producer 7 (FIG. 2) and displayed until the access to the memory jumps to the nearest one of the explosion frames E1, E2 and E3 shown in FIG. 11 on the memory disc. After that the game goes to the next scene. The small square symbol 15 indicates a collision between the player's ship and one of the various planets. This triggers the explosion sequence, starting with the half collision scene produced by the fixed image producer 7.

Figure 8:
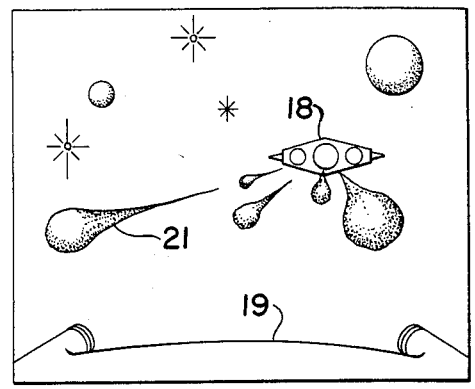
FIG. 8 is a pictorial illustration of a video display according to the frame organization of FIG. 7.
Figure 10:
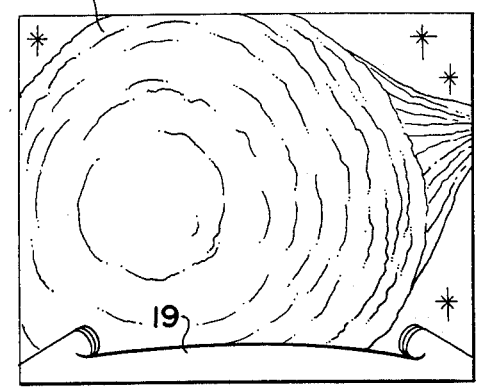
FIG. 10 is a pictorial illustration of a video display according to the frame organization of FIG. 7.

A second example of a game that may be illustrated according to the present invention is a space war shooting game, scenes of which are pictorially illustrated in FIGS. 8, 9 and 10. In this game fire ball-like rockets 21 are ejected from any enemy ship 18 one by one at random to attack the player's ship 19. The distance between the enemy ship 18 and the player's ship 19 is constant. The player's ship 19, however, can move to the left and to the right to avoid the rockets.

Figure 7:
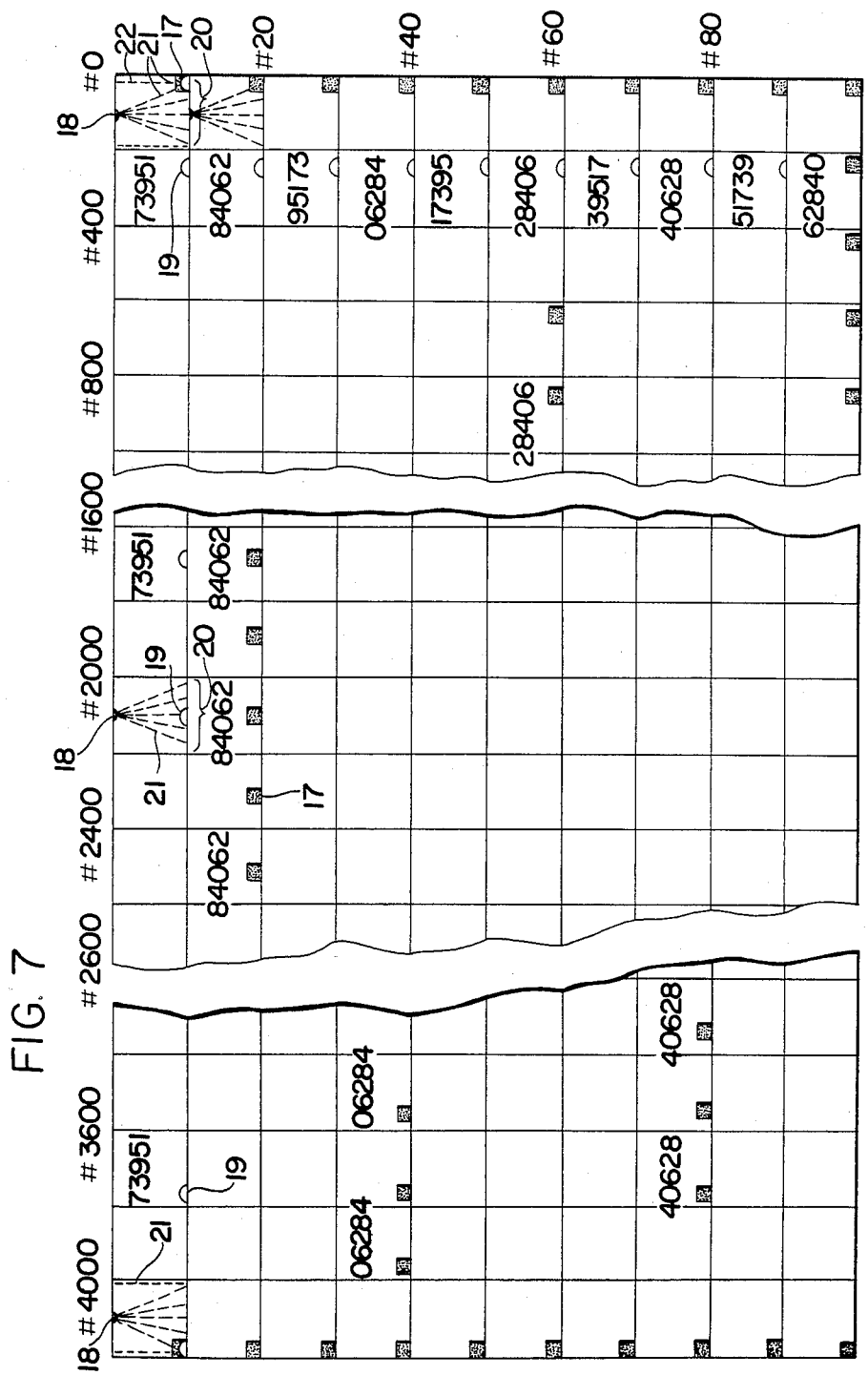
FIG. 7 is a schematic illustration of the frame organization on a linear memory system following a mapping scheme according to the present invention.

FIG. 7 is the frame map for this game. The horizontal axis represents the horizontal scan from frame No. 0 to frame No. 4000. Scanning horizontally creates the left and right movement of the player's ship. The vertical scan is illustrated on the vertical axis labelled as frames No. 0 through 80. The vertical scan simply provides a time flow.

According to this game, the time flow is beyond the player's control. In other words, the flow of the game in the N:1 mode is automatic and it proceeds regardless of the player's control. The N:−1 mode, wherein the frames are scanned in reverse, is not utilized at all. In this instance the joystick has an effect on the display only when it is moved to the right and left. Backward and forward movement will have no effect on the display.

The objective of this game is to shoot down the enemy ship 18, as shown in FIG. 9, in a manner similar to that illustrated in FIG. 6 of the previous game, while at the same time avoiding the fire ball rockets 21. The memory volume for this game is 4000 frames. Each frame or block illustrated in FIG. 7 represents the relative relation among or between the player's ship 19, the enemy ship 18 and the fire ball rockets 21 ejected from the enemy ship 18.

In FIG. 7, the enemy's ship symbol 18 is shown placed at the center of each frame block, but in display scenes FIGS. 8 through 10, the player's ship 19 is always in the center at the bottom. Like the example for the previous game, each block represents the relative position of the frame number coincident with the upper right corner of the block where the horizontal and vertical lines meet. In the frame sequences, the distance between the player's ship 19 and the enemy ship 18 is kept constant.

During the time flow of the vertical scan, fire ball rockets 21 move along five trajectories 20. One fire ball rocket is on each trajectory line. A particular one of these fire ball rockets has a flying cycle of 100 frames. In other words, on the same row of the map the flying phase of the fire ball rockets are all the same, and in each column they fly 1% of the distance per frame from the enemy ship to the player's ship. The five-digit member in frame No. 200 means that the five fire ball rockets traveled 70%, 30%, 90%, 50% and 10% on their respective trajectories in this frame. In the next frame on the vertical axis, the number 84062 means the fire ball rockets traveled 80%, 40%, 0%, 60% and 20% on the respective trajectories in this frame. Therefore all these figures in the frames of the row from 0 to 4000 are the same, while the figures in the column, such as frame No. 210 becomes 84062 because the travel distance has advanced 10% from frame No. 200. Thus the time flow continues and from the bottom of the map to the top, it continues also. Frame 0 means the rocket is at the end of the travel line and also the start of the next rocket cycle, and if the player's ship 19 is at this position, they will collide and explode as shown by the explosion symbol 17.

As shown in FIG. 10 in the scene just before the collision, the fire ball rocket 21 is displayed almost full size on the screen when it is closest to the player's ship. This visual image has great appeal to a player. By horizontally scanning the memory the relative position of the player's ship 19 with respect to the enemy ship 18 changes from the farthest right to the farthest left. To prevent overscan in this mode, fences of many asteroids 22 on both right and left sides are used to block the scenes. The horizontal scan will be in the N:102 and N:−98 mode instead of N:±100 to keep the time flow of the rocket travel during horizontal scan.

Figure 11:
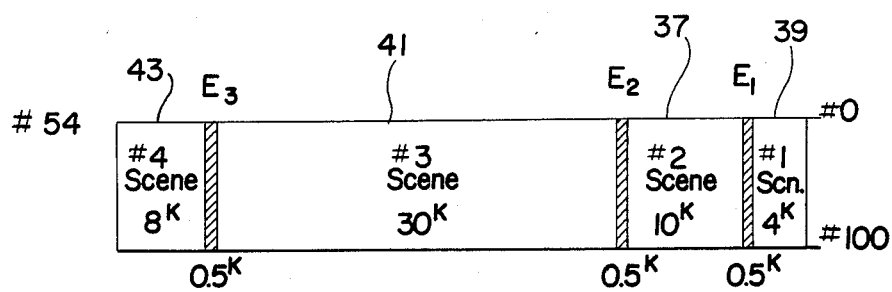
FIG. 11 is a schematic illustration of game scene storage on a linear memory according to the present invention.

FIG. 11 is a pictorial illustration of the frame allocation in gross of all the scenes for each of the games on a disc. For example, the 4K block 39 depicting the scenes for game No. 1 is for the space game explained in connection with the memory map of FIG. 7 and the pictorial illustrations of FIGS. 8 through 10. The 10K memory block 37 for the scenes of game 2 are for the space war game illustrated with respect to FIG. 3 and the pictorial illustrations of FIGS. 4 through 6. Likewise, a series of scenes for a third game (not illustrated) having for example, a 30K frame requirement 41 is illustrated, as well as an 8K block 43 for a smaller game. The explosion scenes E1, E2 and E3 each take up 0.5K of frame space and are allocated on the memory disc at the end of each game frame sequence. The entire storage utilized for scene frames in this example is 53.5K.

Figure 12:
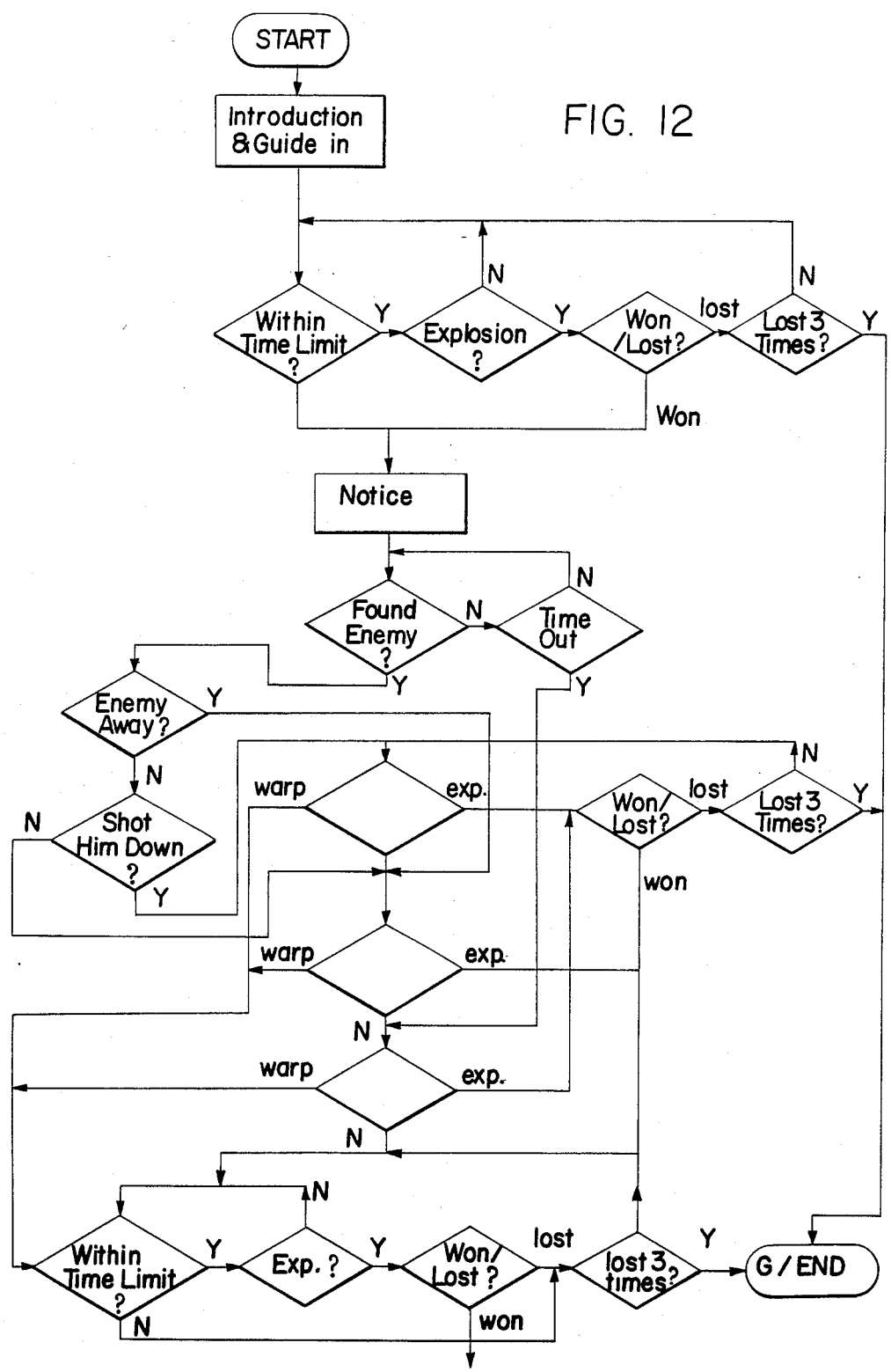
FIG. 12 is a flow chart of a game that may utilize the display system of the present invention to great advantage.
Figure 13:
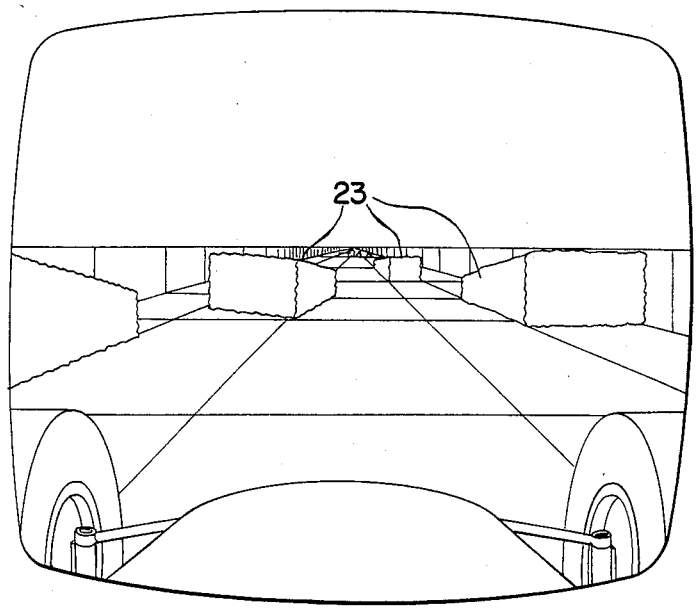
FIG. 13 is a pictorial illustration of a scene that may be illustrated according to the present invention.
Figure 14:
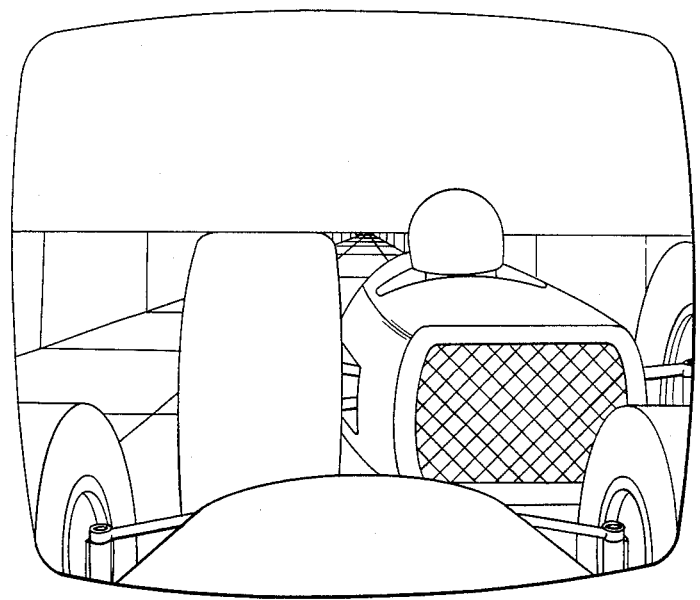
FIG. 14 is a pictorial illustration of a scene that may be illustrated according to the present invention.

FIG. 12 is a flow chart illustration of the space games described above. However, this particular game procedure is not limiting on the invention. Many other applications on the invention described herein are possible. Many other types of games may be played and illustrated according to the present invention. For example, car racing games as well as various sports games and shooting games may utilize the present invention to great advantage. All these games may utilize realistic movie excerpts as actual scenes, for example.

An example of a racing game display is shown in FIGS. 13 through 16. In this game, the player drives his car in the foreground steering left and right to avoid colliding with several cars in a group 23. When near a collision with a car in front of him (FIG. 14) a huge figure of the other car appears, which the player finds very impressive. This particular game, for example, can be laid out in the same manner that the space war game illustrated in the memory map of FIG. 7 was laid out. In the racing game, however, the rocket travel of FIG. 7 is simply replaced with a racing group of many cars 23. Thus the relative positions of the cars in the group change gradually, like the planet positions 10, 11, 12 and 13 of FIG. 7 changed.

Figure 15:
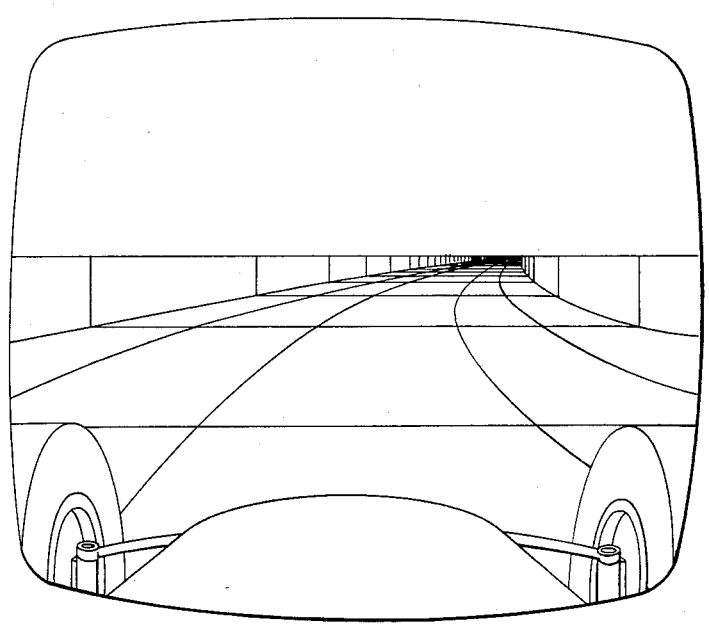
FIG. 15 is a pictorial illustration of a scene that may be illustrated according to the present invention.
Figure 16:
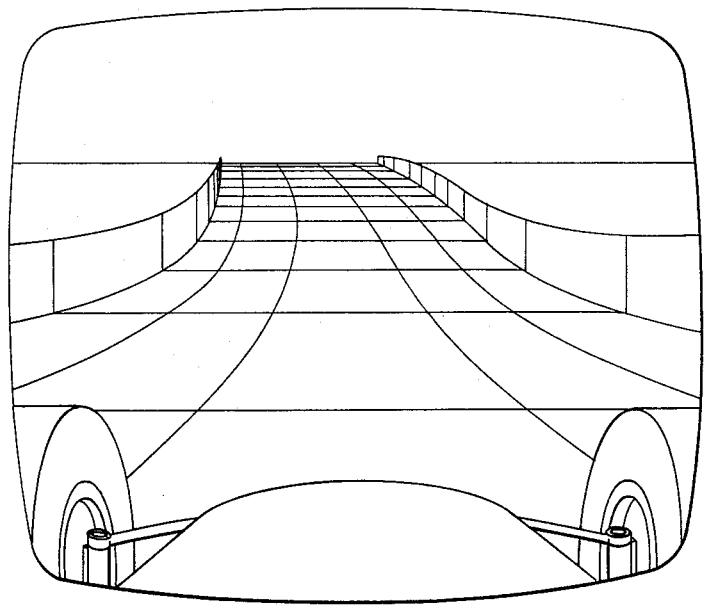
FIG. 16 is a pictorial illustration of a scene that may be illustrated according to the present invention.

In addition, the race course can be changed to a curved one as shown in FIG. 15, or an up and down one as shown in FIG. 16.

Figures 17, 18:
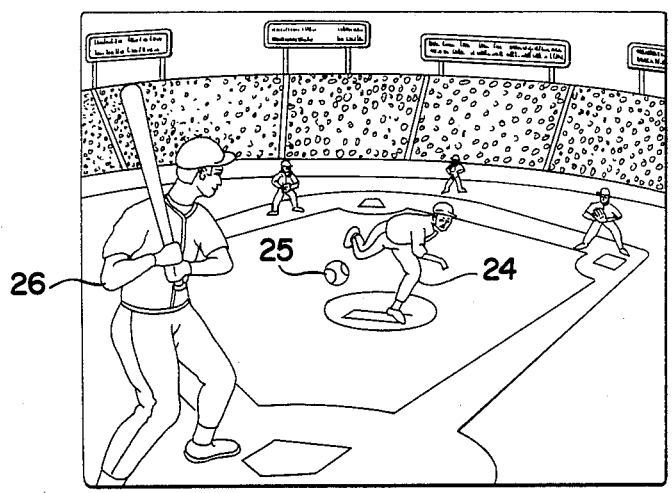
FIG. 17 is a graphic illustration of a storage scheme for the game illustrated pictorially in FIG. 18.
FIG. 18 is a pictorial illustration of a scene that may be illustrated according to the present invention.

An example of another application of the present invention to illustrate a video game is shown in FIGS. 17 and 18. This game relates to the game of baseball in which the game player can participate by being the batter 26. As illustrated in FIG. 17, the frames are organized in a typical televised baseball sequence for a variety of pitches coming from the pitcher 24. The player as the batter 26 uses a swing button to swing his bat at a time when the ball 25, thrown by a famous pitcher 24, is in the strike zone. The player can let the pitch go by if he thinks it will not be a strike. From the moment that the button to swing the bat is pushed, the display scene changes according to the combination of swing time and the nature of the pitch. A variety of pitches may be used, such as a fast ball, screw ball, slow ball, fork ball, knuckle ball, etc., which may result in either a strike or a ball.

This particular game may be implemented in accordance with the invention by using the swing button to generate scanning in a horizontal direction in an N:102 mode. Vertical scan in the N:1 mode is for the pitcher's pitching motion and the ball's travel. Scanning in the N:100 and the N:−1 mode are not used. This game is able to be organized in a 45K frame volume, which provides fifteen kinds of different pitches and 2 seconds of scene after the swing.

What has been described is a memory mapping technique for linear memories which provides a very realistic and interactive visual display on a CRT screen. The organization of the scenes can be accomplished through a computer sorting process to provide just about any relative motion between the player's symbol and the objects in the scene. Thus, it should be understood that the foregoing disclosure relates only to preferred embodiments of the invention and that modifications may be made therein without departing from the spirit and scope of the invention as set forth in the appended claims.

What is claimed is:

1. A data storage arrangement comprising:
   a video disk means for storing data as frames readable therefrom,
   a series of frames stored on said video disk means and arranged to provide a first series of sequential scenes with means to read said video disk in a first direction, and a second series of sequential scenes with means to read from said video disk in a second direction, and wherein every Nth frame on said video disk constitutes one of a third series of sequential scenes with means to read said third series of sequential scenes in either a first or second order, wherein N is an integer greater than 1.

2. The storage arrangement of claim 1 wherein, according to said first series of scenes when read in said first direction, the apparent distance between a viewer and an object in front of said viewer decreases with time; wherein, according to the first series of scenes when read in said second direction, the apparent distance between a viewer and an object in front of the viewer increases with time; wherein, according to the second series of scenes when read in said first order, an object in front of the viewer apparently moves to the viewer's right with time; and wherein, according to the second series of scenes when read in said second order, an object in front of the viewer appears to move to the viewer's left with time.

3. The storage arrangement of claim 1 wherein, according to said first series of scenes when read in said first direction, the apparent distance between a viewer and an object in front of said viewer decreases with time; wherein, according to said first series of scenes when read in said second direction, the apparent distance between a viewer and an object in front of the viewer increases with time; wherein, according to said second series of scenes when read in said first order, an object in front of the viewer apparently moves to the viewer's right with time; and wherein, according to said second series of scenes when read in, said second order an object in front of the viewer appears to move to the viewer's left with time.

4. The storage arrangement of claim 1 wherein, according to said first series of scenes when read in said first direction, the apparent distance between a viewer and an object in front of said viewer decreases with time; wherein, according to said first series of scenes when read in said second direction, the apparent distance between a viewer and an object in front of the viewer increases with time; wherein, according to said second series of scenes when read in said first order, an object in front of the viewer apparently moves to the viewer's right with time; and wherein, according to said second series of scenes when read in said second order, an object in front of the viewer appears to move to the viewer's left with time.

5. In combination with a CRT display system wherein scenes and objects are displayed on the CRT screen in response to graphic image information being read from a memory and movement of an object being displayed may be directed by a manually-manipulated control device, the improvement comprising:
   a one dimensional memory storage means for storing graphic image information as a series of sequential scenes accessible according to four jump sequences, each of which provides a unique series of scenes; and
   means for selectively reading the first jump sequence, the second jump sequence, the third jump sequence and the fourth jump sequence, the first jump sequence when read providing each scene for display in sequential order, the second jump sequence when read providing each scene for display in the reverse of said sequential order, the third jump sequence when read providing for display of each Nth scene in a first sequence, and the fourth jump sequence when read providing for display of each Nth scene in a sequence which is the reverse of said first sequence, wherein N is an integer greater than 1.

6. The improvement of claim 5 wherein said first sequence contains scenes that decrease the apparent distance between a viewer and an object in front of said viewer, said second sequence contains scenes that increase the apparent distance between a viewer and an object in front of said viewer, said third sequence contains scenes that apparently move an object in front of said viewer to the viewer's right, and said fourth sequence contains scenes that apparently move an object in front of said viewer to the viewer's left.

7. The improvement of claim 5 wherein said first sequence contains scenes that apparently move an object in front of said viewer down with respect to the viewer, said second sequence contains scenes that apparently move an object in front of said viewer up with respect to the viewer, said third sequence contains scenes that decrease the apparent distance between a viewer and an object in front of said viewer, and said fourth sequence contains scenes that increase the apparent distance between a viewer and an object in front of said viewer.

8. The improvement of claim 5 wherein said first sequence contains scenes that apparently rotate an object in front of said viewer to the right, said second sequence contains scenes that apparently rotate an object in front of said viewer to the left, said third sequence scenes that apparently increase the size of an object in front of said viewer, and said fourth sequence contains scenes that apparently decrease the size of an object in front of said viewer.

9. The improvement of claim 5 wherein each one of the four jump sequences affects the apparent spatial relationship of an object in front of the viewer with respect to the viewer or an apparent physical characteristic of an object in front of the viewer.

* * * * *